Dec. 15, 1936.     W. MESSINGER     2,064,352
SELF ALIGNING MOUNTING FOR BEARINGS
Filed Jan. 11, 1936     3 Sheets-Sheet 1

INVENTOR
William Messinger
BY
Augustus B. Stoughton
ATTORNEY.

WITNESS:
Robt. P. Mitchel.

Dec. 15, 1936.  W. MESSINGER  2,064,352

SELF ALIGNING MOUNTING FOR BEARINGS

Filed Jan. 11, 1936  3 Sheets-Sheet 2

WITNESS:

INVENTOR
William Messinger
BY
Augustus B. Stoughton
ATTORNEY.

Patented Dec. 15, 1936

2,064,352

UNITED STATES PATENT OFFICE 2,064,352

SELF-ALIGNING MOUNTING FOR BEARINGS

William Messinger, Philadelphia, Pa.

Application January 11, 1936, Serial No. 58,665

8 Claims. (Cl. 80—55)

The invention pertains to the art of mounting bearings for machinery so that they will possess the feature of self-alignment or capacity for angular adjustment necessary to maintain parallelism of the central axes of bearing and shaft.

The principal object of the invention is to provide a simple and effective self-aligning mounting for bearings which is compact and inexpensive and can be conveniently applied to the bearings of new or existing machines.

A second object is to provide a self-aligning mounting for bearings that is unrestrained in its action by friction due to large loads.

A third object is to provide a self-aligning mounting for bearings which in addition to effecting angular alignment also permits a limited amount of lateral and longitudinal movement of the bearing casing with respect to its supporting structure.

A fourth object is to provide a self-aligning mounting for bearings capable of transmitting bearing pressures from the bearing casings to a machine frame, without introducing localizations of stress which would establish irregular load distribution within the bearing.

A fifth object is to provide a self-aligning mounting for bearings having a cushioning or shock-absorbing characteristic that will serve to protect the bearing from damage due to impact loading.

In general, the invention consists of one or more sheets of a compressible liner material confined in a suitable recess in the machine frame. The bearing loads are transmitted through this liner in passing from the bearing casing to the frame. Compensating compressive and lateral deformations of the liner material establish and maintain the desired condition of accurate bearing alignment.

These and other objects of the invention will be apparent from the following description at the end of which the invention will be claimed.

Reference will be made to the accompanying drawings forming part hereof and in which, Figure 1 is a diagrammatic end view, partly in section, showing a bearing support of the invention as it would be applied to the roll-neck bearings of a rolling mill.

Figure 6:
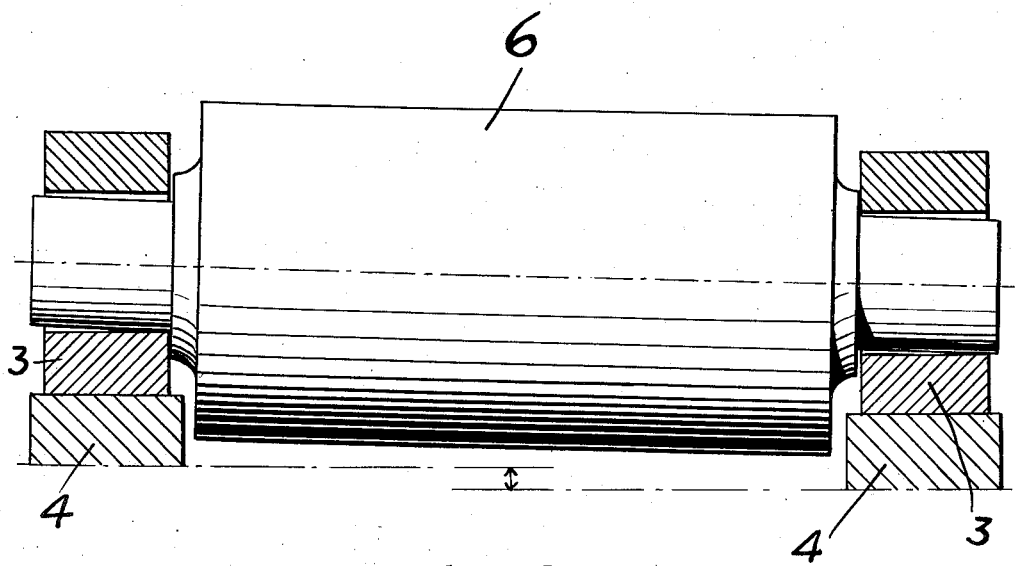
Figure 6 is a partial side view of a rolling mill illustrating diagrammatically a frequently occurring condition of roll-neck bearing misalignment.

Misalignment of bearings, such as shown in Figure 6, produces an unsymmetrical condition of loading which sets up destructive force concentrations at their ends. This condition is particularly undesirable in the case of anti-friction bearings in which hardened steel rolling elements operate upon hardened races.

In steel mill rolling practice, for example, where it is frequently necessary to change rolls, the rolls must be adjusted to a condition of accurate alignment each time they are reassembled in the mill. Because of the great weight of these rolls, and the limited time available for making changes, misalignment due to unequal elevation of the bearing casing supporting surfaces, as illustrated in Figure 6, is difficult to avoid unless some satisfactory means is provided for self-alignment. Another well-known form of bearing misalignment is that resulting from elastic deflections of roll necks or shafting.

Numerous methods have been devised in the past for correcting the improper alignment of anti-friction bearings. Means frequently employed include spherical seats, knife-edge and rolling supports, and self aligning anti-friction bearings with curved inner and outer races. None of these methods is universally applicable to all types of installations; each possesses its individual range of usefulness which is subject to certain limitations. All of the aforementioned systems have been recommended for application to rolling mills, and while certain of them are in present use, none has been generally adopted in this field.

The present invention has been devised for the purpose of providing completely effective self-alignment of plain or anti-friction bearings, under the very heavy loads encountered in rolling mill practice, in an economical manner with regard to space requirements and cost.

It should be emphasized, however, that the invention is equally applicable to many other kinds of machinery in addition to rolling mills. The rolling mill has been selected as convenient for purposes of illustration, but it is not intended to limit the application of the invention to this class of machine.

Figure 5:
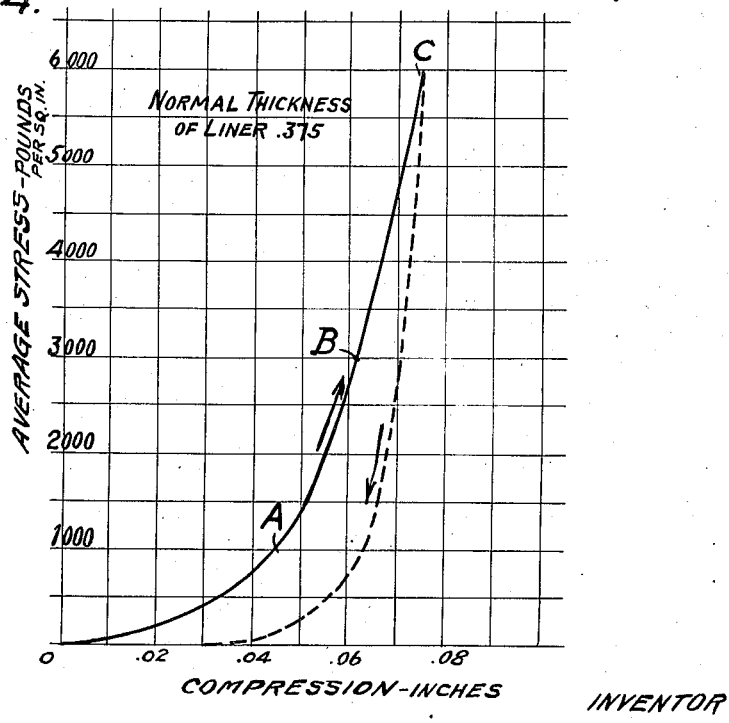
Figure 5 is a curve, the ordinates of which represent load in pounds per square inch and the abscissae reduction in thickness in inches for a preferred liner material used in the invention.

Figure 5 is a graph in which the ordinates indicate specific loadings in compression and the abscissae represent yield or reduction in thickness of a compressible liner, the basic element of this invention. The extraordinary behavior of this liner in respect to the extent of its yield under varying magnitude of loading is a characteristic of the material of which the liner is composed and this characteristic is well coordinated with the functional requirements of most machines, a rolling mill being a characteristic example which will be described.

The working elements consist of a vertical tier of rolls, two, three, or four high, the combined weight of which together with their journal bearing casings may impose a specific loading of 150 lbs. per sq. in. of supporting surface on the bottom of the mill-housing window. The graph, Figure 5, shows that a liner of this invention .375" thick will compress .010" under this loading and would compensate for this much misalignment between a roll-neck bearing casing and its support, if it would be lodged between the two surfaces. When the mill is working, for instance cold rolling thin steel strip, the rolling pressures on the roll neck bearings may range between 800,000# and 2,000,000# which would impose an additional specific loading upon the liner of 2,000# per sq. in. to 5,000# per sq. in.

Referring to Figure 5 it is apparent that the liner is compressed .055" when loaded 2,000# per sq. in., and this is quite sufficient yield to assure nearly uniform load distribution upon the bearings under the most unfavorable conditions of misalignment to be met in usual practice. As the mill works with fluctuating rolling pressures between 800,000# and 2,000,000# the liner has to support specific pressures between 2,000# per sq. in. and 5,000# per sq. in. The amount of compression of the liner will fluctuate between .068" and .074" or a range of only .006" as shown by the dash line curve which is the descending calibration curve.

It is well to repeat, only .006", because this is of far-reaching importance. The setting of the rolls in the mill must remain nearly inflexible in order to enable rolling of accurate gauge. If the liner would compress and expand a great amount with changes in the magnitude of the rolling pressure it would be difficult to maintain constant the separation of the rolls which governs the thickness of the metal that is being rolled.

A liner material which can yield a large initial amount under light loading in order to compensate for inaccurate disposition of the journal bearing casings and their supporting surfaces, and thereafter develop stiffer resistance to further compression under the influence of severer loading, is an all desirable material for the just described characteristic function in a rolling mill.

The marked increase in rigidity of the liner is displayed by the rising steepness of the curve, Figure 5, and as set forth in this tabulation:

| | Compression | Lbs. per sq. in. load |
|---|---|---|
| From O to A | .045 | 1000 |
| From A to B | .017 | 2000 |
| From B to C | .013 | 3000 |

Loaded between 3000 lbs. per sq. in. and 6000# per sq. in. the liner compresses only .0043" per 1000# per sq. in. augmented loading, whereas it had compressed ten times this amount or exactly .045" for an equivalent 1000# per sq. in. initial loading.

Referring to the drawings, the bearing support is shown at 1 and 2 and in the instance chosen for illustration it is arranged between the bearing casing 3 and the housing 4. Nickel steel or like plates 5 are arranged beneath the casing 3 and rest upon the element 1 of the bearing support. The element 1 and the bearing plate 5 support the casing 3 and resist the load on the roll 6 which is the mate to the roll 7 that presses upon it. Load is also due to the passage of material between the rolls 6 and 7. 2 is a cavity or rigid cell in which the element 1 is confined and it may be machined or otherwise provided in the housing 4. The element 1 may be in sheet form, and it should possess mechanical properties substantially as specified by the curve, Figure 5. An example of this element 1 is finely divided material, such as felt, sheet fiber, ground cork, burlap, asbestos, and the like, with or without a binder and preferably in sheet form. A preferred material for the purpose comprises powdered cork 54%, gum tragacanth 21%, dried linseed oil 23% and litharge 2%. The choice of material is guided by the characteristics which it should possess as herein described. Consideration may be given in the choice or selection of the material to its resistance to the deteriorating action of oil, water and heat, and to its cost.

Figure 1:
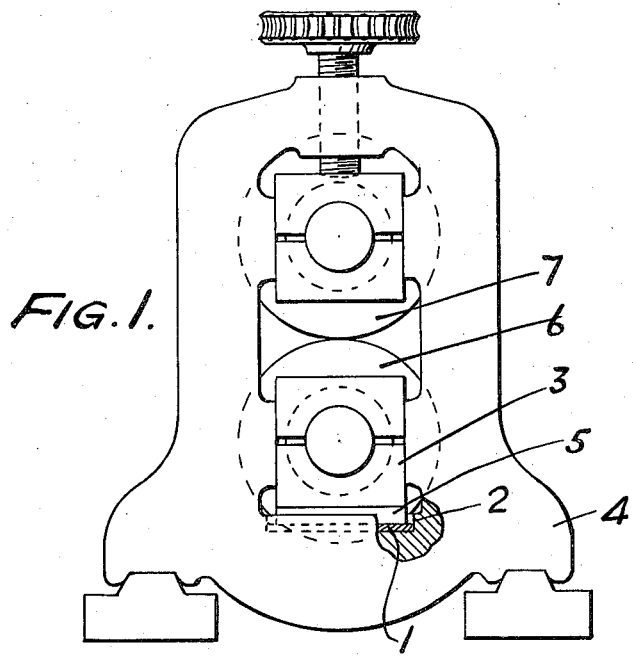
Figure 2:
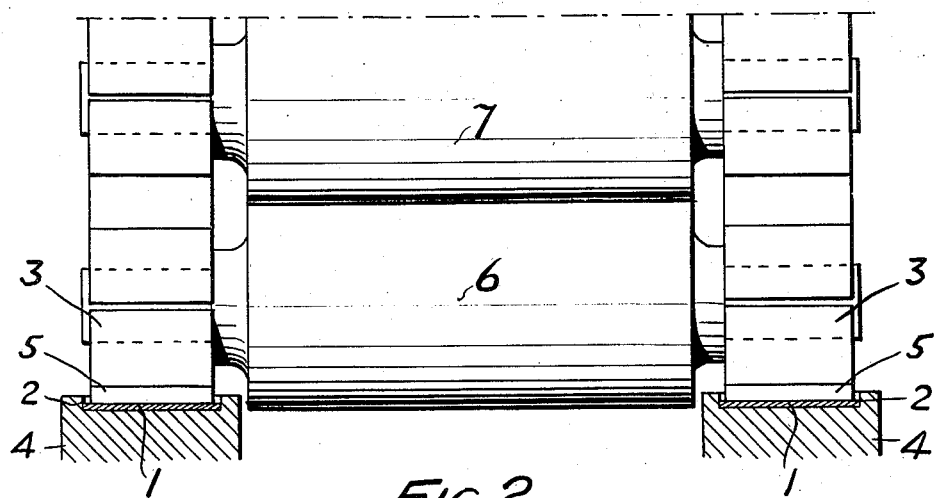
Figure 2 is a partial side view of this mill, showing the bearing support in section.
Figure 3:
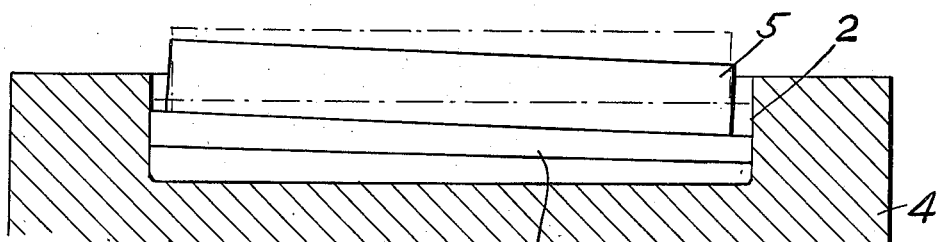
Figure 3 is a schematic view illustrative of the operation of a bearing support embodying the invention and showing this support aligned with an inclined journal or shaft.
Figure 4:
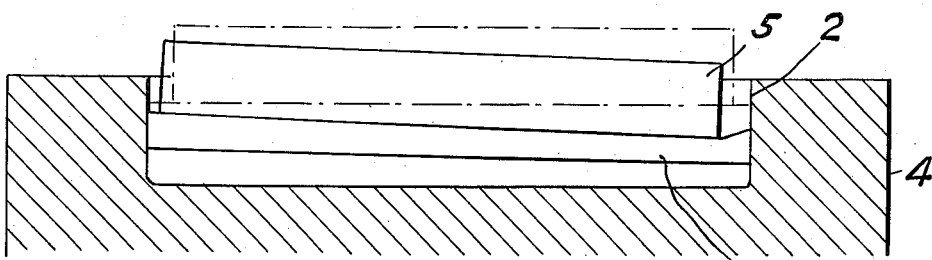
Figure 4 is a similar view showing the bearing support both aligned and shifted in axial direction.

Referring to Figures 3 and 4, they illustrate the mode of operation of the invention in the case of cylindrical roller and tapered roller bearings respectively. Tapered roller bearings transmit axial as well as radial loads so that relative movement of outer and inner members in axial direction is prevented. This requires that provision be made for slight axial displacement of the outer bearing casing during alignment, and Figure 3 shows the manner in which the compressible medium of this invention will undergo the necessary lateral deformation.

I claim:

1. A liner interposed between a bearing casing and the frame of a machine; the compressive behavior of the liner being such that incipient loading of the bearing will cause sufficient compression of the liner to effect proper self-alignment of the bearing casing, and such that additional compression due to augmented loading will be very small in comparison.

2. A pliant liner interposed between a bearing casing and the frame of a machine; the thickness of the liner in relation to its compressive behavior is such that incipient loading of a bearing will cause sufficient compression of the liner to effect proper self-alignment of the bearing casing, but additional compression due to augmented loading will be very small in comparison.

3. A liner consisting of an admixture of powdered cork, vegetable gum, and an oleaginous binder, interposed between a bearing casing and the frame of a machine; the thickness of the liner in relation to is compressive behavior is such that incipient loading of a bearing will cause sufficient compression of the liner to effect proper self-alignment of the bearing casing, but additional compression due to augmented loading will be very small in comparison.

4. In combination, a rolling mill housing having a recess at the bottom of its window opening, sheets of a liner material situated in this recess, and a rigid compression plate fitted in the recess and bearing upon the liner; wherein the thickness of the liner in relation to its yield characteristics is such that incipient loading of a roll-neck bearing will cause sufficient compression of the liner to effect proper self-alignment of the bearing casing with respect to the roll axis, but additional compression resulting from augmented loading will be small and therefore satisfactory from an operating standpoint.

5. In combination, a rolling mill having a recess in the bottom of its window opening, sheets of a liner material consisting of an admixture of powdered cork, vegetable gum, and an oleaginous binder, situated in this recess, and a rigid compression plate fitted in the recess and bearing upon the liner; wherein the thickness of the liner in relation to its yield characteristics is such that incipient loading of a roll-neck bearing will cause sufficient compression of the liner to effect proper self-alignment of the bearing casing with respect to the roll axis, but additional compression resulting from augmented loading will be small and therefore satisfactory from an operating standpoint.

6. The combination with a machine frame and a bearing casing subject to non-uniform loading, of a liner of cork material interposed between the frame and casing and possessed of the property of promptly yielding and compressing under relatively light loads to permit the casing to adjust itself to correct alignment and possessed of the property of thereafter resisting such increased and non-uniform loading as occurs in rolling mill practice.

7. A self-aligning mounting for bearings subject to large specific loading and supporting rotatable elements, consisting of one or more flat sheets of compressible liner material arranged to transmit loads from a bearing casing to a machine frame, in which the liner is of such composition and dimensions that it will undergo sufficient deformation under moderate initial loading to align the bearing casing with respect to the machine frame, but the increment in compression on application of full working load is small in comparison and negligible from an operating standpoint.

8. A bearing mounting for rolling-mills consisting of one or more flat sheets of compressible liner material arranged to transmit bearing loads from a roll-neck bearing casing to a rolling-mill housing, in which the liner is of such composition and dimensions that it will undergo sufficient deformation under moderate initial loading to align the bearing casing with respect to the mill housing, but the increment in compression on application of full working load is small in comparison and negligible from an operating standpoint.

WILLIAM MESSINGER.